Jan. 16, 1923.  
D. F. MINER.  
TOOL HANDLE AND METHOD OF MAKING THE SAME.  
FILED AUG. 6, 1920.
1,442,084.
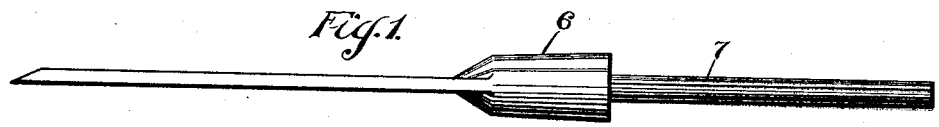
  
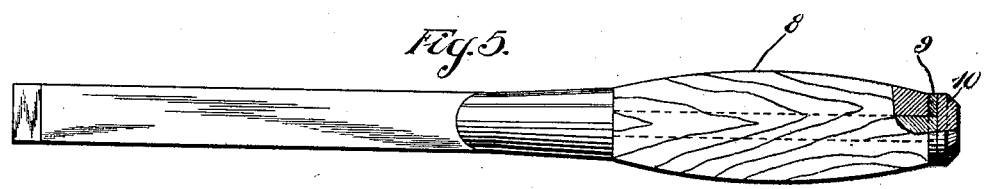
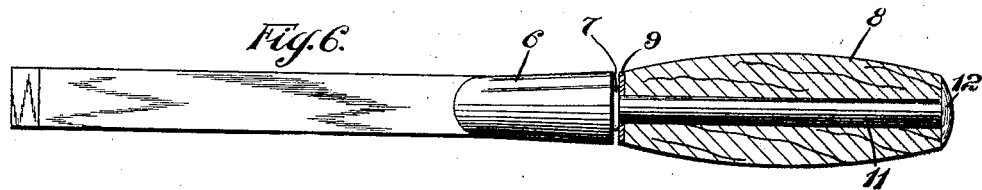
WITNESSES:
INVENTOR  
Douglas F. Miner  
BY  
ATTORNEY Patented Jan. 16, 1923.

1,442,084

UNITED STATES PATENT OFFICE.

DOUGLAS F. MINER, OF WILKINSBURG, PENNSYLVANIA, ASSIGNOR TO WESTINGHOUSE ELECTRIC & MANUFACTURING COMPANY, A CORPORATION OF PENNSYLVANIA.

TOOL HANDLE AND METHOD OF MAKING THE SAME.

Application filed August 6, 1920. Serial No. 401,667.

*To all whom it may concern:*

Be it known that I, DOUGLAS F. MINER, a citizen of the United States, and a resident of Wilkinsburg, in the county of Allegheny and State of Pennsylvania, have invented a new and useful Improvement in Tool Handles and Methods of Making the Same, of which the following is a specification.

My invention relates more particularly to the method of making handles for hand tools, such as chisels, punches, etc., on which blows are struck by a hammer or mallet. In tools of this kind, it is desirable to provide a grip or handle of wood or some other yielding material, in order to protect the hand of the workman from the jars or shocks which his hand would receive through the vibrations of the hammer blows were he to hold the tool by a bare metal handle.

The problem in making an impact tool of this kind has been to provide a yielding grip applied in such manner that, when the tool is in use the grip will be protected from the blows of the hammer, and, at the same time, the efficiency and durability of the all-metal impact tool preserved. My invention is designed to solve this problem.

Fig. 1 of the drawing is a side elevational view of a wood chisel before the handle has been placed thereon;

Figs. 2, 3 and 4 are detail views of a resilient grip, a washer and a metal cap, respectively, forming a portion of the handle;

Fig. 5 is a plan view of the parts of Figs. 1, 2, 3 and 4 in assembled relation, and Fig. 6 is a similar view of a modification.

Referring to Fig. 1, the chisel 6 has a shank 7 on which I mount the grip 8, washer 9 and the metal cap or button 10. The grip 8, which is usually made of wood, is placed on the shank 7, and the washer 9, made of metal or other heat-resisting material, is then placed on the shank.

The cap 10 is then welded to the end of the shank 7, and, in this operation, I prefer to use the percussive method of welding, because it can be accomplished quickly enough to avoid injury to the grip member which would occur were the welding heat applied for a considerable length of time.

The purpose of the metal washer 9 is to protect the wooden grip or handle 8 from the heat of the welding operation, and, in practice, it has been found that the washer will also frequently become slightly welded to the shank, thus adding to the strength of the handle.

In Fig. 6 is shown a modification wherein the boss or shank 7 terminates short of the grip member, and a pin 11, having a head 12, extends through the grip member. The inner end of the pin 11 also extends through the washer 9 and is welded to the shank 7.

I claim as my invention:—

1. The method of making tool handles which consists in placing on the shank of the tool a grip member and then percussively welding a cap on the end of the shank.

2. The method of making tool handles which consists in placing on the shank of the tool, in the order named, a grip member, a heat-protecting member and a metal cap member and then welding said last mentioned member to the end of the shank.

3. The method of making tool handles which consists in placing on the shank of the tool, in the order named, a grip member, a heat-protecting member and a metal cap member and then percussively welding said last mentioned member to the end of the shank.

4. A tool handle, comprising, in combination, a shank, a grip member, a protecting member and a cap welded to the end of the shank to serve as a retaining and impact-receiving member.

5. In combination, in a tool, a shank of smaller cross section than the body, a perforate grip member, a cap welded on the end of the shank, and a protecting member placed between the handle and cap to protect said grip member from the heat of the welding operation.

6. A tool handle comprising, in combination, a shank, a grip member, a grip-retaining member welded to the shank and a member protecting said grip member from the heat of the welding operation.

7. A tool handle, comprising, in combination, a shank, a resilient grip member and a grip-retaining member percussively welded to the shank.

In testimony whereof, I have hereunto subscribed my name this 28th day of July, 1920.

DOUGLAS F. MINER.